Jan. 26, 1932. M. J. MATTHEWS 1,842,760
NUT TAPPING ATTACHMENT FOR MULTIPLE SPINDLE AUTOMATIC SCREW MACHINES
Filed Aug. 9, 1929 2 Sheets-Sheet 1
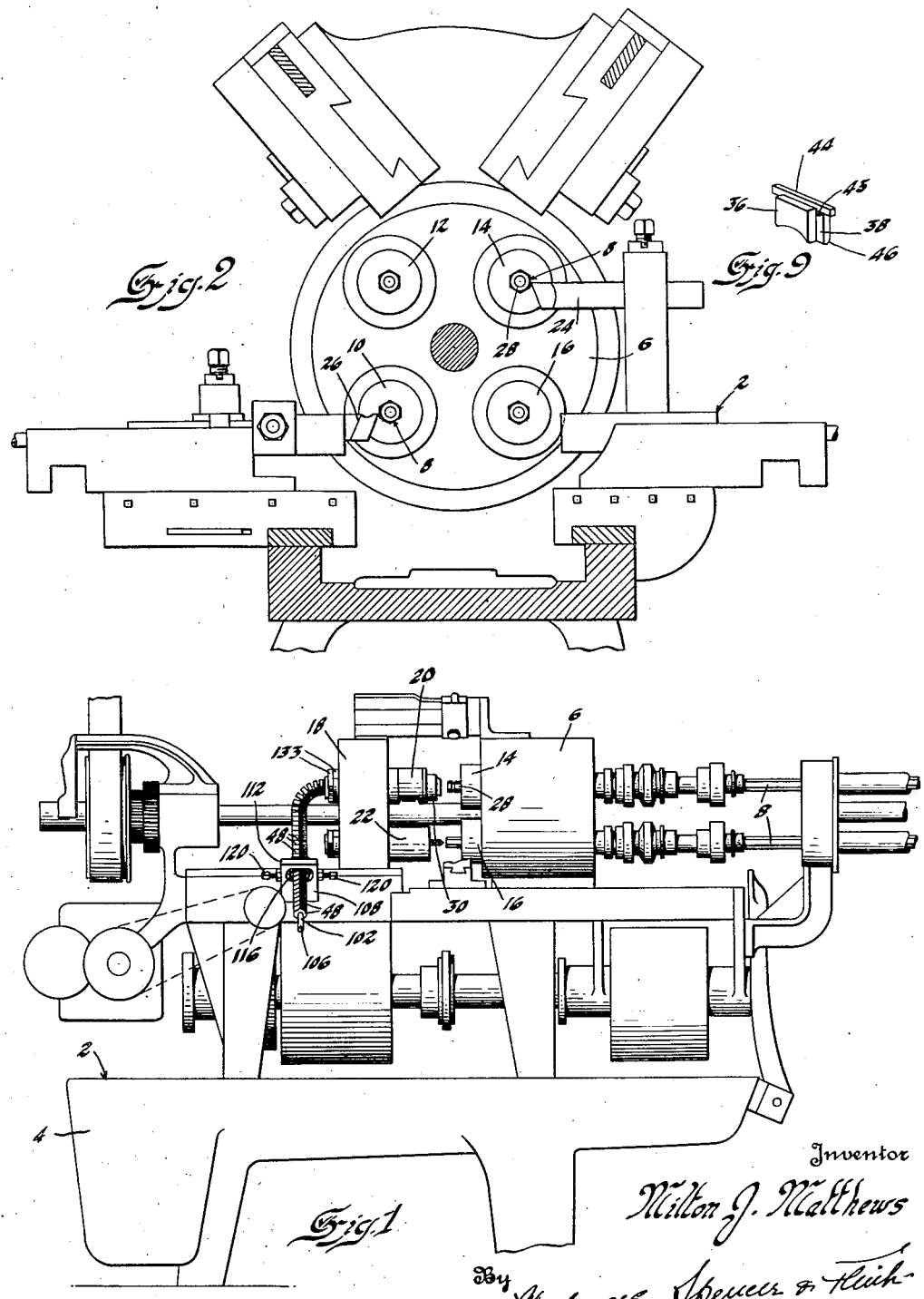

Jan. 26, 1932.  M. J. MATTHEWS  1,842,760
NUT TAPPING ATTACHMENT FOR MULTIPLE SPINDLE AUTOMATIC SCREW MACHINES
Filed Aug. 9, 1929  2 Sheets-Sheet 2
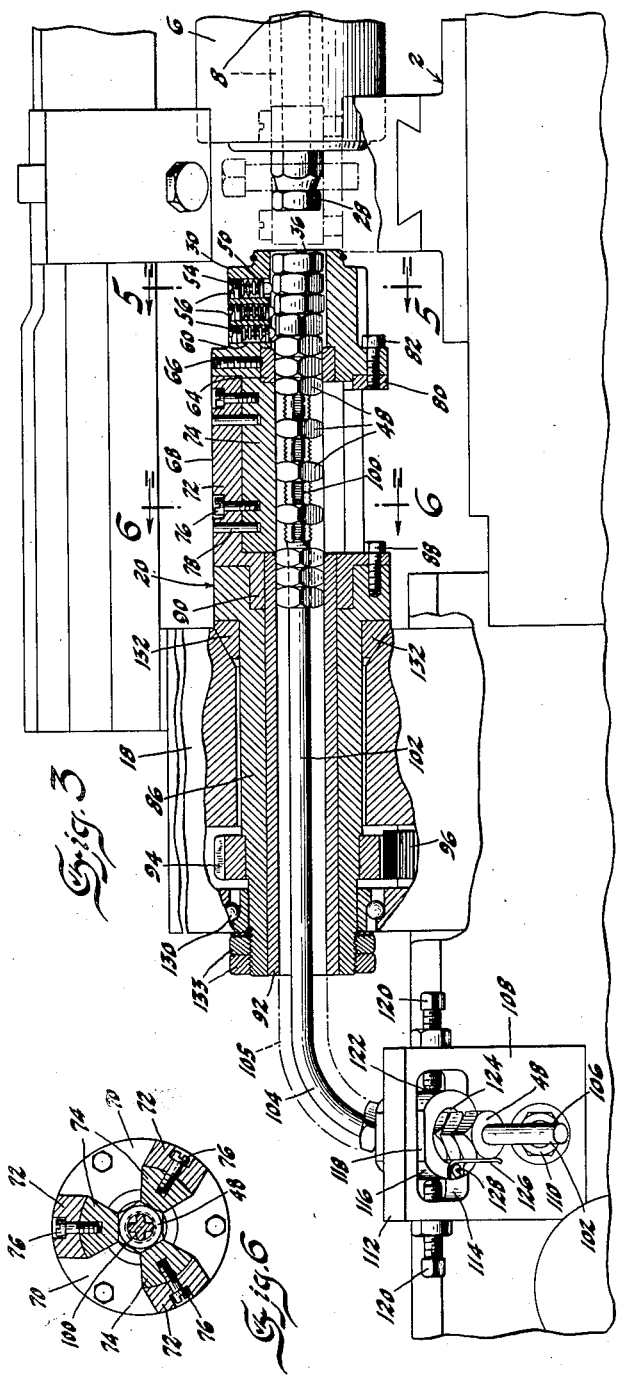
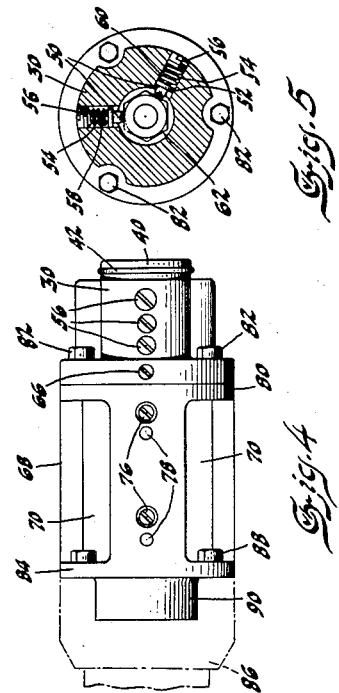
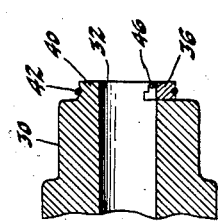
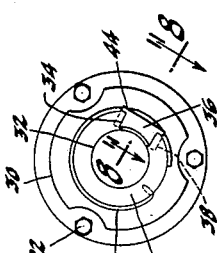
Inventor
Milton J. Matthews
By Blackmore, Spencer & Hunt
Attorneys Patented Jan. 26, 1932

1,842,760

UNITED STATES PATENT OFFICE

MILTON J. MATTHEWS, OF DETROIT, MICHIGAN

NUT TAPPING ATTACHMENT FOR MULTIPLE SPINDLE AUTOMATIC SCREW MACHINES

Application filed August 9, 1929. Serial No. 384,663.

This invention relates to a nut tapping device for multiple spindle automatic screw machines.

In some multiple spindle automatic screw machines in use today the bar of stock from which the nuts are formed is merely shaped and cut off but without threading the nut. It is one of the objects of the present invention to equip the usual multiple spindle automatic screw machine with a nut tapping device whereby the nuts may be tapped or threaded after they are cut off from the stock.

In the machine disclosed on the drawing, four bars of stock are used, although five, six or any other suitable number may be used. The bars are mounted in spindles in a turret and the turret is given a quarter turn at a time in order to bring the bars of the stock into proper position to be worked on by the tools of a reciprocable head. The slidable head has four spindles mounted therein the first of which has a tool which centers the hole and forms a chamfer on the nut sides. The second and third operations are the drilling of the stock to a suitable depth to provide the opening in the nut. The fourth operation cuts the nut from the bar of stock and as the tool head advances toward the stock the spindle at the fourth station will seize and grip the severed nut portion.

The principal part of the invention relates to the tapping of the nut after it is received in the spindle at the fourth operation. The mechanism comprises a rotatable spindle mounted on the slidable tool head. The spindle has a hollow head portion, the hollow being circular. In the end of the head, a recess is provided and in the recess a slidable block is mounted. A spring extending entirely around the head and block constantly urges the block inwardly of the hollow portion and as the nut is forced inwardly of the hollow, it will ride over a tapered edge of the block and be gripped or held by the block to retain the nut in the hollow head.

The head also has a series of spring pressed plungers operating on the nuts after they are received in the head. The purpose of these plungers is to definitely adjust the nuts to the given position to enable them to be passed to a bushing. Beyond the plungers the head is provided with the bushing the interior of which is shaped to conform to the outer shape of the nut. Beyond the bushing the spindle is provided with preferably three jaws or segments the inner faces of which form continuations of the faces of the bushing and are adapted to conform to and fit on the flat sides of the nuts to hold them stationary relative to the spindle.

A bent shank tap is positioned in the hollow center of the spindle and has its head or tapped end terminating at the bushing. As the nuts are received in the head each nut will push the preceding nut through the spindle and force it onto the tap. The tap is held stationary and as the spindle revolves the jaws will rotate the nuts on the tap to cut the threads on the interior of the nuts. After they have been threaded the nuts will ride on the shank portion and will be pushed toward the bent end where they will fall to a suitable receptacle.

On the drawings:

Fig. 1 shows a side view of a multiple spindle screw machine to which the invention is applied;

Fig. 2 is an enlarged view of the turret containing the bars of stock.

Fig. 3 is an enlarged sectional detail of the threading spindle.

Fig. 4 is an enlarged plan view of the spindle of Fig. 3.

Figs. 5 and 6 are sections on the lines 5—5 and 6—6 of Fig. 3.

Fig. 7 is an end view of the head of the nut tapping spindle.

Fig. 8 is a section on the line 8—8 of Fig. 7.

Fig. 9 is a detail of the holding block.

Referring to the drawings, the numeral 2 indicates an automatic multiple spindle screw machine of the type manufactured by the National Acme Company, Cleveland, Ohio. The machine is mounted on the usual bed or table 4 and has the turret 6 for receiving the bars of stock 8. The turret 6 is provided with four spindles 10, 12, 14 and 16, each of which rotates one of the bars of the stock 8. The machine is designed for the manufacture of all small lathe parts and as the invention relates to the manufacture of nuts the bars 8 are preferably of hexagonal shape, but may be square or otherwise.

The machine 2 is also provided with the reciprocable head 18 provided with four spindles, only two of which, 20 and 22 are seen on the drawings. Each of these spindles is rotatable and carries a tool to shape, prepare, cut off or thread the nuts from the bars of stock 8.

While the machine shows and describes but four tools which operate on four bars of stock, it is nevertheless possible to use five or six bars of stock and two or more nut tapping devices as will be explained in connection with the spindle 20.

In the machine illustrated the tool on the spindle operating on the bar of stock at the position 16 will center the nut opening and add the taper or chamfer to the nut edge. The tools on the spindles corresponding to the bars at the positions 10 and 12 will drill a hole in the bar of stock to a depth sufficient to form the opening in the nut. The spindle 20, corresponding to the bar of stock when at the position 14 in Fig. 2, is a nut tapping device and it is to this spindle that the invention is particularly directed. This spindle receives the unthreaded nut or cut off portion of the bar of stock. The cutting off tool is shown at 24 in Fig. 2 and this cutting off tool, as well as the chamfering tool 26, is slidable backward and forward from and to the work as the needs of the operation may require. Except for the nut tapping spindle and its specific construction, the structure and its operation so far described are conventional.

Referring to Fig. 3 the improved form of tapping device is illustrated in section and on a larger scale. The bar is illustrated at 8 and it will be seen that the nut portion 28 has been formed thereon and is about to be severed. The spindle 20 advances from the left and received the nut 28 in the head portion 30. As the nut 28 is received in the head portion it will push along the preceding nuts to force them through spindle. The nut is now severed by the tool 24 and the spindle 20 reciprocated to the left to permit the turret 6 to revolve and swing the bars of stock 8 and the spindles 10–16 inclusive to their new positions, or a quarter of a revolution.

Referring to Figs. 7 and 8 it will be seen that the hollow portion 32 of the head 30 is circular and is provided with a recess, as is indicated at 34. In the recess there is adapted to slide the block 36 provided with lateral ribs 38 which fit in grooves in the reduced portion 40 of the head 30. The inner portion of the block extends into the opening 32 and is spring pressed inwardly by means of the circular spring 42 which surrounds the reduced portion 40, and engages in notches 43 at the sides of the head 44 of the block 36. The outermost portion of the block 36 at the hollow portion 32 is tapered or chamfered as shown at 46 to permit of the ready sliding of the nuts 48 into the hollow 32. When the nuts ride over the tapered portion 46 they will depress the head 36 against the tension of the spring 42 so that when the nuts are at the mouth of the hollow 32, the head 36 will resiliently grip or hold each nut in the head 30. It is, of course, obvious that each succeeding nut will push the preceding one through the head 30 inwardly of the spindle 20.

Beyond the resiliently held block 36 the head 30 is provided with a plurality of plungers 50 having the shoulders 52 on which are seated the coil springs 54, held in position by means of the nut 56 which passes over the stem 58 of the plungers and is screw threaded in the openings 60 in the head, in which openings the plungers 50 are received. As shown in Fig. 5, for hexagonal stock there are preferably two sets of aligned plungers, spaced substantially 120 degrees apart. Either or both sets of plungers may be staggered, if desired. The functions of these plungers is to engage the flat edges 62 of the nuts as shown in Fig. 5 in order to definitely position them and to cause them to pass through the head in a definite position. Instead of the plungers 50, spring pressed balls may be used.

At the end of the head 30 there is positioned the bushing 64, rigidly held in place by the screws 66. The inner periphery of the bushing 66 is shaped to conform to the exterior shape of the nut. In the present instance, the shape is hexagonal. The plungers 50 are for the purpose of positively guiding the nuts 48 so that when they arrive at the bushing 64 they will readily pass through without interference.

It will be understood that inasmuch as the spindle 20 is rotating at all times while the machine is in operation there is no definite interrelated position with which the last nut received in the head will conform to the position of the preceding nut. It is accordingly the function of the plungers to lightly rotate or turn the nuts so that they will assume the position as shown in Fig. 5. If the nut 48 is not in the position shown in Fig. 5 when it is received in the hole 32 of the head 30, the plungers 50 will press against the flat sides to slightly rotate the nut into proper position. This rotation will be aided when the succeeding nut pushes the preceding one through the head 30.

Beyond the head portion the spindle comprises a cylindrical body portion 68, which has cut-outs at intervals as shown at 70 in Figs. 4 and 6. The purpose of these cut out portions is to discard chips and to allow for the easy access of oil to the interior of the spindle. The body portion 68 includes the three arms 72, to the interior of which the blocks 74 are secured by means of the machine bolts 76. The inner portions of the blocks 74 are flat for hexagonal or square stock and conform to and form continuations of the flats on the interior of the bushing 64. It will be obvious, therefore, that as the nuts are pushed through the spindle the bushing 64 will definitely and positively guide each nut 48 into the jaws formed by the blocks 74. Suitable dowel pins 78 may also be used to position the blocks 74 with reference to the arms 72.

By referring to Figs. 3 and 4 it will be noted that the head 30 is secured to a flange 80 on the body portion 68 by means of the machine bolts 82, and a flange 84 on the opposite end of the circular portion 68 is secured to the bearing collar 86 of the spindle 20 by means of the machine bolts 88. The body portion 68 is also provided with an annular extension 90 which fits into a corresponding annular recess in the end of the bearing collar 86 to aid in rigidly holding the circular portion 68 in position. A hollow tube 92 is received within the bearing collar 86 and extends into the annular extension 90 of the body member 68. The diameter of the bore of the tube 92 is such as to rather closely receive the nuts 48. In other words it will be slightly larger than the overall diameter of the nuts 48.

A gear 94 is keyed on to the collar 86 and is driven by a second gear 96 operated in a suitable way from a source of power.

A tap 100, the shank portion 102 of which is bent as indicated at 104, extends centrally through the collar 92 and the body portion 68 of the spindle 20, and terminates at the bushing 64. The tap is held at its rear end in a bracket 108 secured to the slidable head 18, as by means of a bolt and nut 110. The bracket 108 is inclined at its upper end 112 and is provided with an opening as shown at 114. In the opening 114 there is received the block 116 having the flat sides 118 which fit against the flat sides of the opening 114. Adjusting screws 120 are provided, the ends of which strike against the block 116 as shown at 122. The purpose of the block 116 and adjusting screws 120 is to move the shank 102 and tap 100 in one direction or the other to attain the proper position for the end of the tap 100. It will be understood, of course, that the shank 102 and the greater part of the tapped portion 100 are always filled with threaded nuts 48, as indicated by the dotted lines 105. These nuts are adapted to pass through the opening 124 in the block 116 and are held by means of a spring 126 secured on to the block 116 by means of the screw 128. When one of the nuts 48 passes beyond the spring 126 it will fall off the end 106 of the shank 102. A suitable receptacle may be provided below the end 106 to receive the nuts.

The collar 86 is suitably held in the head 18 by the bearings 130 and 132 and the lock nuts 133.

The operation of the structure of Figs. 2–8 inclusive is as follows: As the head 18 is moved to the right, when considering the structure of Fig. 3, the head 30 will slip over the portion 28 of the stock 8 and push along all of the nuts 48 in the head 30 to cause the innermost nut at the bushing 64 to be received on the tap 100. After the tool 24 has severed the nut the head 18 will be withdrawn toward the left and the nut 48 held in the hollow head by means of the spring pressed slidable block 36. The plungers 50 will guide the nuts in the hollow 32 and cause them to adjust themselves so that they will be in proper position to be received in the hexagonal bushing 64. From the hexagonal bushing 64 the nuts will be pushed into the body portion 68 into the jaws formed by the blocks 74 and will be held stationary relative to the spindle 20 and body portion 68. Due to the fact that the spindle is driven through the gears 94 and 96, and because the tap 100 held stationary, the nuts will be interiorly threaded and carried toward the left by the threads of the tap 100. After a nut leaves the tap it will remain stationary until pushed along by the succeeding nut.

Instead of the slidable block 36 and spring 42, it is within the scope of the invention to enlarge the recess 34 and use a flat spring attached to the head 30.

The structure and arrangement of the invention results in a much longer life for the tap 100.

The machine to which the invention is applied is described in "Acme Automatic Multiple Spindle Screw Machines" by Douglas T. Hamilton, published by "Machinery", New York, N. Y., revised and reprinted by The National Acme Co., Cleveland, Ohio, November, 1919, but may be applied to any automatic screw machine.

I claim:

1. In a nut tapping device for application to a multiple spindle screw machine, a spindle including a head portion, resilient means on said head for guiding said nuts through said head, a tap in said spindle, and means in said spindle for guiding said nuts from said head onto said tap.

2. In a nut tapping device, a spindle, a head on said spindle for receiving nuts, plungers mounted in said head to guide said nuts therethrough, a tap in said spindle, and means in said spindle to guide said nuts onto said tap.

3. In a nut tapping device, a spindle, means on said spindle for receiving and positively guiding nuts, a tap in said spindle for receiving said nuts from said means and adapted to thread the same, and a plurality of equally spaced segments on said spindle adapted to engage flat sides on said nuts to hold the same stationary relative to said spindle.

4. In a nut tapping device, a spindle, a head on said spindle having a circular opening adapted to receive nuts, resiliently controlled means on said head for gripping the nut as it is received in the head, each nut received in said head advancing the preceding nut through the head, a tap in said spindle for threading said nuts, and means for holding said nuts and spindle relatively stationary.

5. In a nut tapping device, a spindle, a head on said spindle having a circular opening adapted to receive nuts, a resiliently pressed block in said head to grip and hold each nut as it is received in said opening, each nut received in said head advancing the preceding nut through said head, a tap in said spindle for threading said nuts, and means for holding said nuts and spindle relatively stationary.

6. In a nut tapping device, a spindle, a hollow nut receiving head on said spindle, means at the entrance of said hollow portion for resiliently gripping and holding each nut as it is received in the head, means on said head for guiding said nuts through said head, a bushing shaped to conform to the nuts for receiving the nuts from the guiding means, a tap in said spindle terminating at said bushing and adapted to receive the nuts from said bushing, and means to hold said nuts and spindle relatively stationary.

7. In a nut device, a spindle, a hollow nut receiving head on said spindle, a block slidably mounted at the entrance to said hollow head, a spring surrounding said head and urging said block inwardly of said hollow head, said block adapted to grip and hold each nut as it is received in said head, a tap in said spindle, and means to guide said nuts to said tap.

8. In a nut tapping device, a spindle, a hollow nut receiving head on said spindle, means at the entrance of said hollow head to grip and hold each nut as it is received in the head, a plurality of plungers mounted in said head to positively guide said nuts therethrough, a bushing shaped to conform to said nuts at the end of said head, means for receiving said nuts from said bushing and holding them stationary relative to said spindle, and a tap in said spindle to thread said nuts.

9. In a nut tapping device, a spindle, a hollow nut receiving head on said spindle means on said head to grip and hold each nut as it is received, a plurality of resiliently mounted plungers in said head for guiding said nuts through said hollow head, a bushing at the end of said head and shaped to conform to said nuts, a tap having its end at said bushing, and means on said spindle to receive said nuts from said bushing and hold them about said tap stationary relative to said spindle.

10. In a nut tapping device, a spindle, a hollow nut receiving head on said spindle, a recess in the end of said head, a nut gripping and holding block slidably mounted in said recess, a spring around said head resiliently urging said block inwardly of said hollow head, a plurality of nut guiding plungers in said head, springs urging said plungers inwardly, a nut receiving and guiding bushing shaped to conform to the nuts and positioned at the end of said head beyond said plungers, a tap centrally mounted in said spindle and having its foremost part positioned at said bushing, and a plurality of nut gripping and retaining jaws in said spindle, said jaws forming continuations of the surfaces of said bushing and adapted to grip the flat sides of the nuts to hold them stationary relative to said spindle.

11. In a nut making machine having a revolving turret having a plurality of bars of stock mounted therein and rotatable therewith, a plurality of spindles positioned opposite the bars for centering and drilling the ends of said bars, means for cutting off the drilled portion, a spindle positioned opposite one of said bars to receive the cut off portion directly as it is cut from the bar, and means for tapping said cut off portion in said last named spindle.

12. In a nut tapping machine having a revolving turret having a plurality of bars of stock mounted therein and rotatable therewith, a plurality of spindles positioned opposite the bars for centering and drilling the ends of the bars, means for cutting off the drilled portion, a spindle positioned opposite one of said bars to receive said cut off portion directly as it is cut from the bar, and a tap in said last named spindle for threading said cut off portion.

13. In a nut making machine having a revolving turret having a plurality of bars of stock mounted therein and rotatable therewith, a plurality of spindles positioned opposite the bars for centering and drilling the ends of said bars, means for cutting off the drilled portion, a spindle positioned opposite one of said bars to receive the cut off portion directly as it is cut from the bar, and a bent shank tap in said last named spindle to thread said cut off portion.

14. In a nut making machine having a revolving turret having a plurality of bars of stock mounted therein and rotatable therewith, a plurality of spindles positioned opposite the bars for operating on the ends of said bars to prepare the ends in the forming of a nut, means to cut off the formed end portion of said bars, a spindle positioned opposite one of said bars to receive said cut off portion directly as it is cut from the bar, means in said spindle non-rotatably to hold said cut off portions, means to rotate said spindle, and means in said spindle to thread said portion.

15. In a nut making machine having a revolving turret having a plurality of bars of stock mounted therein and rotatable therewith, a plurality of spindles positioned opposite the bars for operating on the ends of said bars to prepare the ends in the forming of a nut, means to cut off the formed end portion of said bars, a spindle positioned opposite one of said bars for receiving said cut off portion directly as it is cut from the bar, means in said spindle for non-rotatably holding said portions, means to rotate said spindle, and a tap in said last named spindle to thread said portions.

16. In a nut making machine having a revolving turret having a plurality of bars of stock mounted therein and rotatable therewith, a plurality of spindles positioned opposite the bars for operating on the ends of said bars to prepare the ends in the forming of a nut, means to cut off the formed portion of said bars, a spindle positioned opposite one of said bars to receive said cut off portion directly as it is cut from the bar, means in said spindle for non-rotatably holding said cut off portions, means to rotate said spindle, and a bent shank tap in said last named spindle for threading said portions.

17. In a nut making machine having a revolving turret having a plurality of bars of stock mounted therein and rotatable therewith, a plurality of spindles positioned opposite the bars for operating on the ends of said bars to prepare the ends in the forming of a nut, means to cut off the formed portion of said bars for threading, a spindle positioned opposite a bar to receive said cut off portion directly as it is cut from the bar, a tap in said spindle, means in said spindle for guiding said portions onto said tap, and means to rotate said spindle to cause the threading of said cut off portions.

In testimony whereof I affix my signature.

MILTON J. MATTHEWS.